(12) United States Patent
Srivastava et al.

(10) Patent No.: US 12,067,983 B2
(45) Date of Patent: Aug. 20, 2024

(54) ROBUST USEFUL AND GENERAL TASK-ORIENTED VIRTUAL ASSISTANTS

(71) Applicant: UNIVERSITY OF SOUTH CAROLINA, Columbia, SC (US)

(72) Inventors: Biplav Srivastava, Chapin, SC (US); Kausik Lakkaraju, Columbia, SC (US); Revathy Venkataramanan, Columbia, SC (US); Vishal Pallagani, Columbia, SC (US); Vedant Khandelwal, Columbia, SC (US); Hong Yung Yip, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 192 days.

(21) Appl. No.: 17/714,508

(22) Filed: Apr. 6, 2022

(65) Prior Publication Data
US 2022/0358922 A1 Nov. 10, 2022

Related U.S. Application Data

(60) Provisional application No. 63/284,272, filed on Nov. 30, 2021, provisional application No. 63/185,168, filed on May 6, 2021.

(51) Int. Cl.
*G10L 15/22* (2006.01)
*G06F 3/16* (2006.01)
*G06F 9/38* (2018.01)

(52) U.S. Cl.
CPC ............. *G10L 15/22* (2013.01); *G06F 3/167* (2013.01); *G06F 9/38* (2013.01); *G10L 2015/221* (2013.01); *G10L 2015/223* (2013.01)

(58) Field of Classification Search
CPC ............... G10L 15/22; G10L 15/1822; G10L 2015/223; G10L 15/1815; G10L 15/30; G10L 2015/221; G10L 15/28; G10L 15/16; G10L 15/222; G10L 2015/225
See application file for complete search history.

(56) References Cited

U.S. PATENT DOCUMENTS 10,496,705 B1 * 12/2019 Irani ................. G06F 16/90328
10,534,623 B2 * 1/2020 Harper .................... G06F 3/048
11,307,752 B2 * 4/2022 Meyer .................... G06F 9/451
(Continued)

OTHER PUBLICATIONS

Amazon, TaskBot Challenge Rules, Alexa Prize, 14 Pages. Retrieved Feb. 17, 2023 from Website: https://www.amazon.science/alexa-prize/taskbot-challenge/rules.
(Continued)

*Primary Examiner* — Vijay B Chawan
(74) *Attorney, Agent, or Firm* — DORITY & MANNING, P.A.

(57) ABSTRACT

The disclosure deals with a system and method for improved general task-oriented virtual assistants (VAs). The presently disclosed framework incorporates discovery of knowledge from online sources to accomplish tasks (open world), user-specific knowledge for personalization, and domain-specific knowledge for context adaptation to recommend and assist the users over procedural tasks such as cooking and Do-it-Yourself (DIY) tasks. The approach also focuses on content curation for fault-tolerant execution to ensure the end goal is reached despite common failures.

16 Claims, 3 Drawing Sheets

(56) References Cited

U.S. PATENT DOCUMENTS

| | | | |
|---|---|---|---|
| 2015/0302003 A1* | 10/2015 | Yadgar | H04M 3/4936 704/9 |
| 2019/0057079 A1* | 2/2019 | Raanani | G10L 15/22 |
| 2019/0130912 A1* | 5/2019 | Yadgar | G10L 15/22 |
| 2020/0302919 A1* | 9/2020 | Greborio | G10L 15/1822 |
| 2021/0056970 A1* | 2/2021 | Jain | G06F 16/3329 |
| 2022/0358922 A1* | 11/2022 | Srivastava | G06F 9/38 |

OTHER PUBLICATIONS

Behnke et al., New Developments for Robert—Assisting Novice Users Even Better in DIY Projects, Proceedings of the International Conference on Automated Planning and Scheduling, vol. 30, Issue 1, 2020, pp. 343-347. https://doi.org/10.1609/icaps.y30i1.6679.

Bhat et al., Towards Modeling Revision Requirements in WikiHow Instructions, Proceedings of the 2020 Conference on Empirical Methods in Natural Language Processing (EMNLP), 2020, pp. 8407-8414. https://aclanthology.org/2020.emnlp-main.675/https://aclanthology.org/2020.emnlp-main.675.pdf.

Chen et al., Chat with Smart Conversational Agents: How to Evaluate Chat Experience in Smart Home, MobileHCI '19: Proceedings of the 21$^{st}$ International Conference on Human-Computer Interaction with Mobile Devices and Services, Article 60, Oct. 2019, pp. 1-6. (Abstract Only) https://dl.acm/org/doi/abs/10.1145/3338286.3344408.

Deriu et al., Survey on Evaluation Methods for Dialogue Systems, Artificial Intelligence Review, vol. 54, 2021, pp. 755-810. https://link.springer.com/article/10.1007/s10462-020-09866-x.

Dunbar et al., Human Conversational Behavior, Human Nature, vol. 8, No. 3, Sep. 1997, pp. 231-246. https://www.researchgate.net/publication/227022782_Human_conversational_behavior.

Engelhardt et al., Better Faulty Than Sorry: Investigating Social Recovery Strategies to Minimize the Impact of Failure in Human-Robot Interaction, 2017, 8 Pages. https://ceur-ws.org/Vol-1943/WCIHAI-17-03.pdf.

Farmer et al., Psychosocial Benefits of Cooking Interventions: A Systematic Review, Health Education & Behavior, vol. 45, Issue 2, Apr. 2018, pp. 167-180. (Abstract Only) https://pubmed.ncbi.nlm.nih.gov/29121776/.

Higham et al., An Introduction to Multimodal Communication, Behavioral Ecology and Sociobiology, vol. 67, 2013, pp. 1381-1388. (Abstract Only) https://link.springer.com/article/10.1007/s00265-013-1590-x.

Kadariya et al., kBot: Knowledge-Enabled Personalized Chatbot for Asthma Self-Management, 2019 IEEE International Conference on Smart Computing (SMARTCOMP), 2019, pp. 138-143. https://ieeexplore.iece.org/document/8784055 https://www.researchgate.net/publication/334892145_kBot_Knowledge-Enabled_Personalized_Chatbot_for_Asthma_Self-Management.

Food Network. Retrieved Feb. 17, 2023 From Website: https://www.foodnetwork.com/fn-dish/news/echo-show-food-network-kitchen-features.

Kephart et al., An Embodied Cognitive Assistant for Visualizing and Analyzing Exoplanet Data, IEEE Internet Computing, vol. 23, Issue 2, Mar.-Apr. 2019, pp. 31-39. (Abstract Only) https://ieeexplore.ieee.org/document/8673551.

Lee et al., Recipe Box, Eight Portions, 2022. Retrieved Feb. 17, 2023 from Website: https://eightportions.com/datasets/Recipes.

Riberio et al., Cooking an Ontology, International Conference on Artificial Intelligent: Methodology, Systems and Applications, 2006, pp. 213-221. (Abstract Only) https://link.springer.com/chapter/10.1007/11861461_23.

Sonboli et al., Fairness and Transparency in Recommendation: The Users' Perspective, UMAP '21: Proceedings of the 29th ACM Conference on User Modeling, Adaptation and Personalization, Jun. 2021, pp. 274-279. https://arxiv.org/abs/2103.08786.

Srivastava et al., Personalized Chatbot Trustworthiness Ratings, IEEE Transactions on Technology and Society, vol. 1, Issue 4, Dec. 2020, pp. 184-192. (Abstract Only) https://ieeexplore.ieee.org/document/9197648.

Stieglitz et al., Defining Bots in an Enterprise Context, Published in International Conference on Interaction Sciences, 2018. (Abstract Only) https://www.semanticscholar.org/paper/Defining-Bots-in-an-Enterprise-Contect-Stieglitz-Brachten/5lbf5298094e4a81de0637f330b8bclec47851ec.

Walker et al., DARPA Communicator Evaluation: Progress From 2000 to 2001, ICSLP-2002: International Conference on Spoken Language Processing, Interspeech 2002, Denver, CO, 6 Pages. https://www.researchgate.net/publication/2523935_Darpa_Communicator_Evaluation_Progress_From_2000_To_2001.

Xu et al., Personalized Recommendation Based on Reviews and Ratings Alleviating the Sparsity Problem of Collaborative Filtering, 2012 IEEE Ninth International Conference on e-Business Engineering, 2012, pp. 9-16. (Abstract Only) https://ieeexplore.ieee.org/document/6468211.

Zhang et al., Reasoning about Goals, Steps, and Temporal Ordering with WikiHow, Proceedings of the 2020 Conference on Empirical Methods in Natural Language Processing (EMNLP), 2020, pp. 4630-4639. https://arxiv.org/abs/2009.07690.

\* cited by examiner

| S. No. | Solution Component | Current Practice | Novelty |
|---|---|---|---|
| 01 | Content discovery and selection | - Search a particular website and return the top results [2] | - Start with an anchor site to recommend<br>- Discover new contents over time and perform collective analysis on the content<br>- Reconcile new information with existing information as per user preference |
| 02 | Content Curation | *(We are aware of none)* | - Estimate the probabilities of failures in a given task with respect to user<br>- Curate solutions to recover from each possible failures |
| 03 | Instruction execution orchestration | - Assist in executing the instruction one by one<br>- Investigate the success of the step<br>- Move on to the next step [3] | - Proactive monitoring to intervene in case of failure at any given step to suggest recovery options<br>- Encourage user with feedbacks<br>- Use multimodal resources to help the user understanding each step when necessary |
| 04 | Fault-tolerant execution | - Detect the failure<br>- Decide whether to redo the step or give up and start new [3] | - Replan the step by suggesting recovery options computed<br>- Advice about possible common failures beforehand |
| 05 | Dynamic recommendation | - Recommend tasks/instructions based on the reviews or ratings [4] | - Improve the user experience and reduce boredom by suggesting alternative ways to do a given task |
| 06 | Human modeling in collaboration | - Ask the user about their preferences beforehand and store them in the user-specific KG [5] | - Learn user's personal preferences overtime from the observation<br>- Confirm with questions if only necessary |
| 07 | Our value-added ontology | - Static user preference knowledge graph for personalized recommendation [5] | - Update the user preference ontology based on the observations from (6)<br>- Curate a domain-specific ontology for cooking and DIY to assist in the content curation process |
| 08 | Human-centric values | *(We are aware of none)* | - De-stress the user by making the task execution a recreational activity |

FIG. 3  (TABLE 1)

ROBUST USEFUL AND GENERAL TASK-ORIENTED VIRTUAL ASSISTANTS

PRIORITY CLAIM

The present application claims the benefit of priority of U.S. Provisional Patent Application No. 63/185,168, titled Robust Useful and General Task-Oriented Virtual Assistants, filed May 6, 2021, and of U.S. Provisional Patent Application No. 63/284,272, titled Robust Useful and General Task-Oriented Virtual Assistants, filed Nov. 30, 2021, both of which are fully incorporated herein by reference for all purposes.

BACKGROUND OF THE PRESENTLY DISCLOSED SUBJECT MATTER

The disclosure deals with a system and method for general task-oriented virtual assistants.

The ability of the voice assistants to understand user's intent and ensure successful task execution is limited. The use of voice assistants (VA) for various tasks is on the rise. It is estimated that by 2024, the number of VAs will reach 8.4 billion units—a number higher than the world's population. From general chitchat to controlling smart home appliances, VAs are currently capable of performing a wide array of tasks. However, the tasks are atomic and are only compatible with a single-turn instruction. But, in the real world, a successful completion of the task would require multi-turn conversations, accommodating task failures, seeking out alternatives based on type of failures, and if appropriate, motivating the human to complete the task. The current state-of-the-art VAs do not yet possess the aforementioned functionality.

To summarize, four common problems with task-oriented chatbots are:
 (1) They may cover a narrow range of topics and not allow the user to lead the conversation flexibly. The user has only limited options of navigating through the dialogue trees constructed for a small range of popular topics.
 (2) They have a fixed set of instructions (e.g., When user asks, "How to make an omelet," he is prompted the same steps every time). They do not discover and analyze new content over time as per user preference (e.g., (Bot)—"Megan, how about you add some veggies to your omelet this time?").
 (3) They have very limited failure detection. Current methods for failure detection include redoing or skipping the step instead of suggesting a new plan (replan) to overcome the failure and still reach the goal.
 (4) They have very limited personalization for the user. The closest available personalization is to ask the user his preferences during device setup and to continue recommending based on that instead of learning a user's choices over time.

Some prior papers or disclosures concerning VAs include the following: Stieglitz et al. [17] states that VAs can be addressed via voice or text as the user input and obtain the sought-after information in return; Higham et al. [18] emphasizes the importance of multiple modalities, especially vision for effective communication; Behnke et al. [19] suggests using a curated domain-specific ontology coupled with hierarchical planning to assist novice users perform better in Do-It-Yourself (DIY) tasks. However, the approaches lack being able to curate task-specific instructions dynamically and to handle errors that might happen on the go; Bhat et al. [20] predicts beforehand the possibility of revision requirements in the instructions. This is data-intensive and lacks scalability as the instruction's training data for a wide variety of possible tasks cannot be obtained; Engelhardt et al. [21] attempts handling possible failures in a human-robot setting. However, the failure recovery steps are very limited—redo the action or discard the failed action, which would not make much sense in a human-VA setting trying to solve the task of cooking an omelet; Sonboli et al. [22] emphasizes the importance of personalization in VAs; Kadariya et al. [23] built a knowledge-enabled personalized chatbot for asthma self-management; Farmer et al. [24] provides research evidence showing the impact of cooking, which can be generalized to any human activity or task. The personalization aspect, in our approach, is derived from questionnaires and day-to-day conversations with the user, bringing in a positive psychological balance.

The presently disclosed technology would offer competitive advantage over existing technology. In particular, presently disclosed subject matter would relate to improved task bots, collaborative assistants, chatbots, discovering instructions/recipes, failure recovery, and proactive assistance.

SUMMARY OF THE PRESENTLY DISCLOSED SUBJECT MATTER

Aspects and advantages of the presently disclosed subject matter will be set forth, in part, in the following description, or may be apparent from the description, or may be learned through practice of the presently disclosed subject matter.

Broadly speaking, the described system incorporates user-specific knowledge for personalization and domain-specific knowledge for context adaptation to recommend and assist users over procedural tasks, such as cooking and DIY. The approach also focuses on content curation for fault-tolerant execution to ensure the end goal is reached.

For example, some of the novelties of this work are as follows: Discovering instructions in the open world and selecting authoritative results—those that the user may have preference over; robust fault tolerant instructions to recover from failures easily; dynamic recommendation while execution is proceeding; decision-making to intervene only when necessary; and usage of domain-specific knowledge graph.

We expand on these competitive advantages:
 (a) Content discovery and selection
  Existing: Search a particular website and return the top results.
  Novelty: Start with an anchor site to recommend, but discover and analyze new content over time, often reconciling the existing information as per user preference.
 (b) Content curation—derive new insights from data as they accumulate over time.
  Existing: We are aware of no current approach.
  Novelty: Given a task, estimate the probabilities of failure and curate recovery solutions.
 (c) Instruction execution orchestration—simulation of the instructions.
  Existing: Execute the instructions in hierarchy.
  Novelty: Proactive monitoring to intervene in the case of failure; use multimodal resources to help the user in understanding each step when necessary.
 (d) Fault tolerant execution
  Existing: Redo or give up the step if failure is detected.
  Novelty: Replan the step suggesting recovery options and advice about common failures beforehand.

(e) Dynamic recommendation
  Existing: Recommends solutions based on the reviews or ratings.
  Novelty: Improve the user experience and reduce boredom by suggesting alternate ways to do a given task.
(f) Human modeling in collaboration
  Existing: Ask the user about their preferences beforehand and store them in the user preferences.
  Novelty: Learn the user's personal preferences over time from observation.
(g) Value added ontology—use external knowledge sources.
  Existing: We are aware of no current approach.
  Novelty: Curate a domain-specific ontology for tasks to assist in the content curation process.
(h) Human centric values—sense user's psychological attributes and respond appropriately when the user needs help.
  Existing: We are aware of no current approach.
  Novelty: Destress (e.g., cooking is considered a stress-buster activity) the user and provide health centric inputs (e.g., use less salt than your usual intake).

One exemplary embodiment of subject matter presently disclosed herewith is a method comprising using at least one or more processors programmed to perform acts of accessing information specifying at least one corresponding user-specified task to be achieved; in response to the user-specified task, causing a VA executing on the one or more processors to discover instructions from online data sources for achieving the user-specified task, assist the user in performing the instructions or monitor execution of the instructions by the user, observe failures of execution of the instructions, and help recover from action and instruction level failures until completion of the user-specified task.

Other example aspects of the present disclosure are directed to systems, apparatus, tangible, non-transitory computer-readable media, user interfaces, memory devices, and electronic devices for general task-oriented VAs. To implement methodology and technology herewith, one or more processors may be provided, programmed to perform the steps and functions as called for by the presently disclosed subject matter, as will be understood by those of ordinary skill in the art.

It is to be understood that the presently disclosed subject matter equally relates to associated and/or corresponding apparatuses or systems. One exemplary such embodiment relates to a system comprising at least one or more computer processors programmed to perform acts of accessing information specifying at least one corresponding user-specified task to be achieved; causing a VA to, in response to the user-specified task, execute on the one or more computer processors to discover instructions from online data sources for achieving the user-specified task, assist the user in performing the instructions or monitor execution of the instructions by the user, observe failures of execution of the instructions, and help recover from action and instruction level failures until completion of the user-specified task.

Another exemplary embodiment of presently disclosed subject matter relates to at least one non-transitory computer-readable storage medium storing processor-executable instructions that, when executed by at least one or more computer processors, cause the at least one or more computer processors to perform a method comprising acts of accessing information specifying at least one corresponding user-specified task to be achieved; in response to the user-specified task, causing a VA executing on the one or more computer processors to discover instructions from online data sources for achieving the user-specified task, assist the user in performing the instructions or monitor execution of the instructions by the user, observe failures of execution of the instructions, and help recover from action and instruction level failures until completion of the user-specified task.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 3 (TABLE 1) describes the components of the presently disclosed framework.

Repeat use of reference characters in the present specification and drawings is intended to represent the same or analogous features, elements, or steps of the presently disclosed subject matter.

DETAILED DESCRIPTION OF THE PRESENTLY DISCLOSED SUBJECT MATTER

Reference will now be made in detail to various embodiments of the disclosed subject matter, one or more examples of which are set forth below. It is to be understood by one of ordinary skill in the art that the present disclosure is a description of exemplary embodiments only and is not intended as limiting the broader aspects of the disclosed subject matter. Each example is provided by way of explanation of the presently disclosed subject matter, not limitation of the presently disclosed subject matter. In fact, it will be apparent to those skilled in the art that various modifications and variations can be made in the presently disclosed subject matter without departing from the scope or spirit of the presently disclosed subject matter. For instance, features illustrated or described as part of one embodiment can be used with another embodiment to yield a still further embodiment. Thus, it is intended that the presently disclosed subject matter covers such modifications and variations as come within the scope of the appended claims and their equivalents.

In general, the present disclosure is directed to technology which is a general task-oriented VA. In particular, a system and method are provided for robust, useful and general task-oriented VAs.

The novelties of the disclosed task bot in contrast to the existing solutions are elucidated below:
(a) Content discovery and selection
  Existing: Search a particular website and return the top results.
  Novelty: Start with an anchor site to recommend, but discover and analyze new content over time, often reconciling the existing information as per user preference.
(b) Content curation—derive new insights from data as they accumulate over time.
  Existing: We are aware of no current approach.
  Novelty: Given a task, estimate the probabilities of failure and curate recovery solutions.
(c) Instruction execution orchestration—simulation of the instructions.
  Existing: Execute the instructions in hierarchy.
  Novelty: Proactive monitoring to intervene in the case of failure; use multimodal resources to help the user in understanding each step when necessary.
(d) Fault tolerant execution
  Existing: Redo or give up the step if failure is detected.
  Novelty: Replan the step suggesting recovery options and advice about common failures beforehand.
(e) Dynamic recommendation
  Existing: Recommends solutions based on the reviews or ratings.
  Novelty: Improve the user experience and reduce boredom by suggesting alternate ways to do a given task.
(f) Human modeling in collaboration
  Existing: Ask the user about their preferences beforehand and store them in the user preferences.
  Novelty: Learn user's personal preferences over time from observation.
(g) Value added ontology—use external knowledge sources.
  Existing: We are aware of no current approach.
  Novelty: Curate a domain-specific ontology for tasks to assist in the content curation process.
(h) Human centric values—sense user's psychological attributes and respond appropriately when the user needs help.
  Existing: We are aware of no current approach.
  Novelty: De-stress (e.g., cooking is considered a stressbuster activity) the user and provide health centric inputs (e.g., use less salt than your usual intake).

Figure 1:
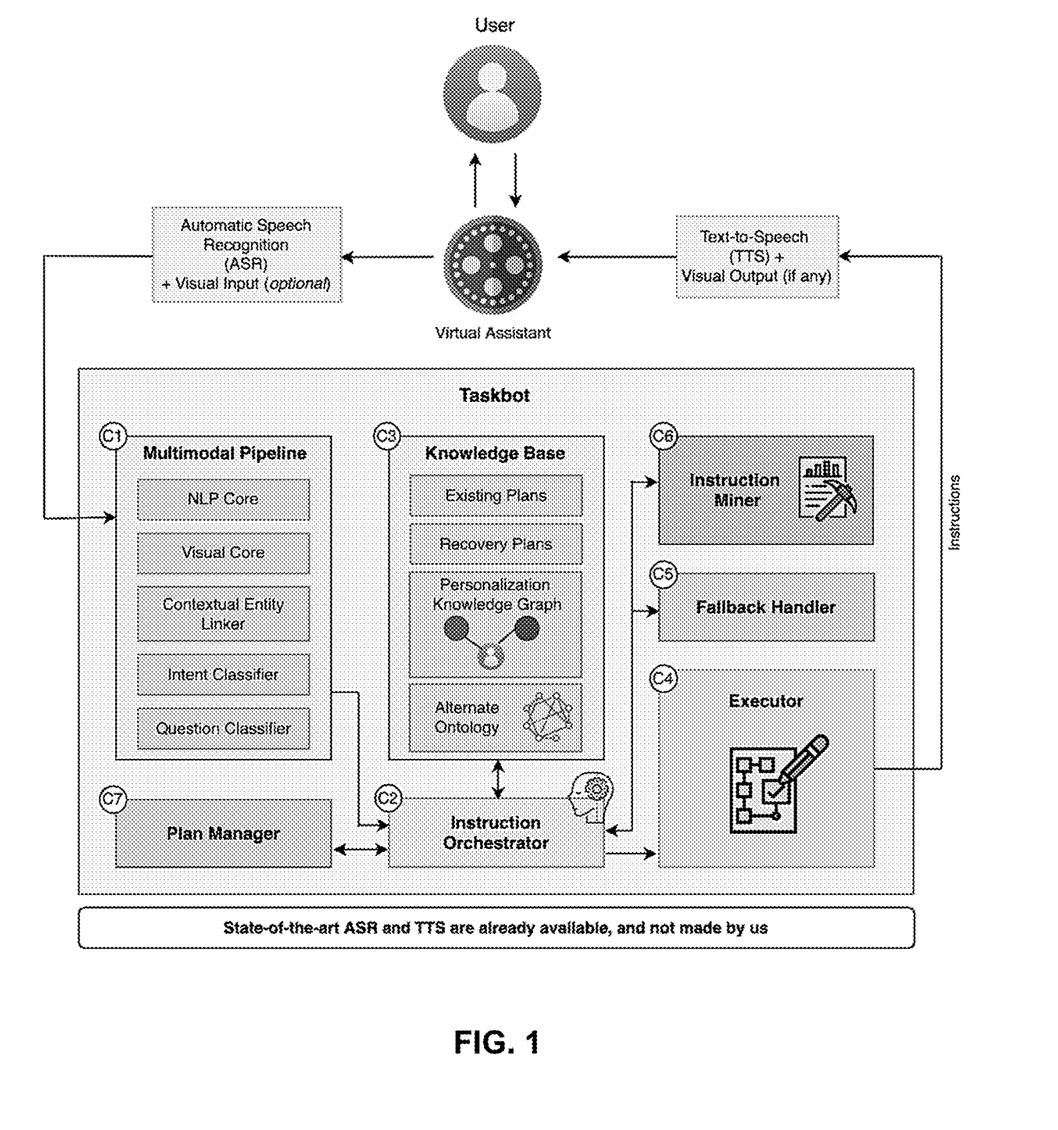
FIG. 1 illustrates representative exemplary System Architecture for presently disclosed subject matter.

The presently disclosed subject matter details are captured in the Diligent™ Task Bot module of FIG. 1 (state-of-the-art ASR and TTS are already available). The key components present in the system are:

Multimodal Pipeline (C1): Houses the necessary modules for assimilating the multimodal user input and also identifying the intent and question type (open-ended/close-ended).

Instruction Orchestrator (C2): The think-tank, responsible for choosing the right workflow depending on the user conversation.

Knowledge Base (C3): Where the user personalized knowledge graph (KG), a KG for suggesting alternatives for a task (e.g., an alternative to oil can be butter, given the task of cooking an omelet) are present. The knowledge base also stores the existing plans and recovery plans to overcome failure, if any during the execution of a plan.

Executor (C4): Responsible for enumerating the workflow, with prompt guidance from the orchestrator, and for relaying the computed set of instructions to the end user. These instructions can be multimodal, often illustrating how to perform a particular instruction in detail to the user.

Fallback Handler (C5): Handles incomprehensible user queries (posed to the task bot framework) by providing a generic response from the VA.

Instruction Miner (C6): Entrusted with the responsibility of mining multimodal, reliable instructions for the task at hand by scraping information available in the public domain (e.g., wikihow.com, answers.com, etc.).

Plan Manager (C7): Responsible for generating a plan for the given task or plan retrieval if a plan already exists for that particular task. It will come up with a recovery plan using our top-k failures and recovery plans dataset if the user reports an instruction failure. This dataset will dynamically be updated if new recovery plans are mined by the instruction miner.

In addition to voice or text, the presently disclosed subject matter also considers visual input. In addition to visual input, the presently disclosed approach also relays visual instructions to better assist the user in performing the task.

Dynamic content curation with recovery plans for successful completion of a task in spite of failure is modelled in the presently disclosed approach.

Since the presently disclosed approach is dynamic in nature, it adapts to the task and mines instructions from reliable sources. Dynamic instruction mining and the plan manager develop recovery plans based on the conversation with the user, making sure the task reaches completion in spite of a monetary failure.

Taking cues from some prior work, the presently disclosed subject matter implements a personalization KG which helps in developing better suited recommendations for the user.

The presently disclosed VA aims to learn the user's preferences and health conditions from day-to-day conversations and store them in the personalization KG.

Further, the presently disclosed subject matter considers the successful completion of a task to be just one side of the coin. The other side is adding human centric values to the presently disclosed approach. Thus, the presently disclosed VA will be able to encourage humans, empathize with them, and help them successfully perform the task.

Presently disclosed subject matter is referred to as "MyBuddy," which provides a robust, useful, general task bot. The ability of VAs to understand user intents and ensure successful task execution is limited. The Alexa® TaskBot Challenge encourages solutions for this. The presently disclosed framework incorporates user-specific knowledge for personalization and domain-specific knowledge for context adaptation to recommend and assist the users over procedural tasks such as cooking and DIY. The approach also focuses on content curation for fault-tolerant execution to ensure the end goal is reached.

The Alexa® TaskBot competition challenges others to achieve successful task execution in two complex domains: cooking and home improvement [1]. The presently disclosed framework utilizes a dynamic user-specific KG for personalized recommendation and a domain-specific KG to aid in the content curation process. To ensure successful task completion, the probabilities of failures concerning each task and their recovery options will be computed. Over time, the probabilities of failures will be adjusted with respect to the user. Further, new recommendations will be made to make the task execution as a recreational activity rather than a duty. The contributions of this work include discovering instructions in the open world and selecting authoritative results and those that the user may have preference over (i.e., robust fault-tolerant instructions to recover from failures easily; dynamic recommendation while execution is proceeding; decision making to intervene only when necessary; domain-specific KG).

The goal a person wants to achieve will be called a task. In order to achieve the task, the VA (here, Alexa®) needs to perform either parallel or hierarchical execution of instructions; steps and instructions are used interchangeably. For example, if the task is cooking an omelet, sample instructions to achieve the task can be (1) Heat oil in a pan, (2) break eggs into the pan, and so on.

TECHNICAL APPROACH

A. Illustration

Figure 2:
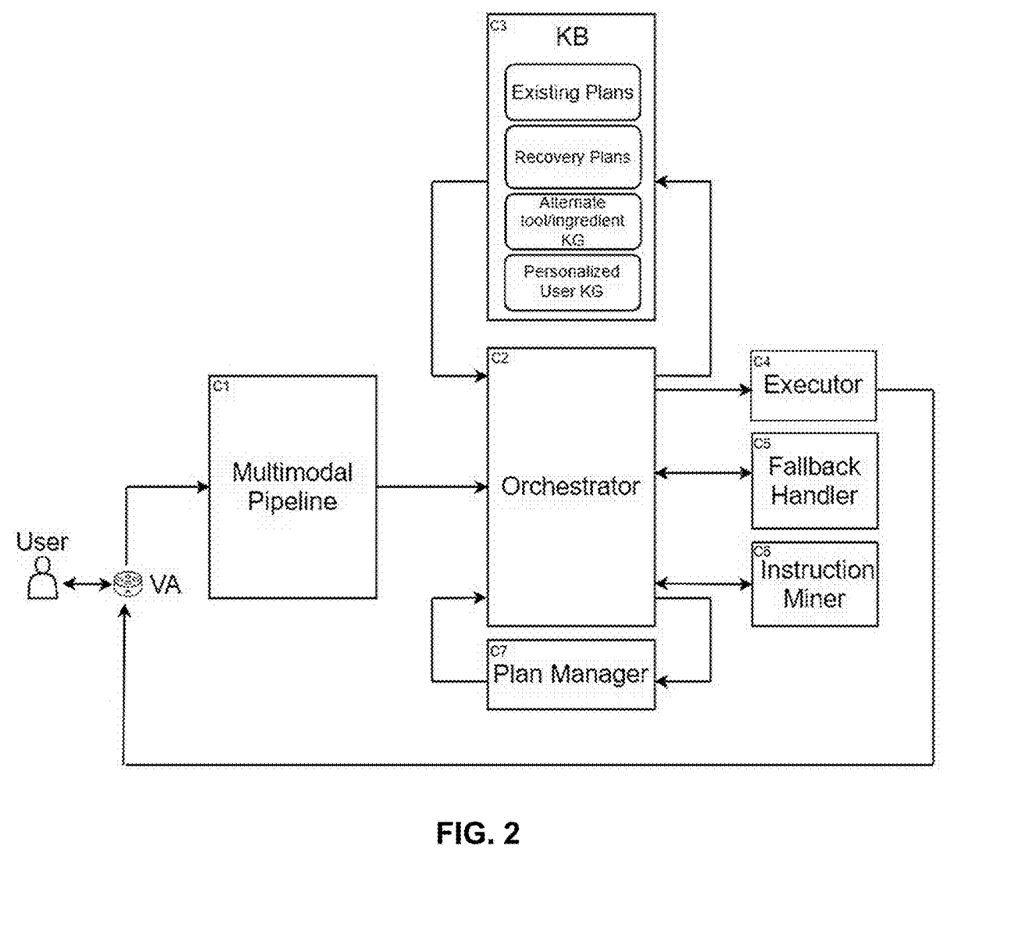
FIG. 2 illustrates an exemplary presently disclosed method for the preferred embodiment using Amazon® Alexa® TaskBot—a commercial product.

Let us assume a sample scenario where the user wants to make an omelet to illustrate the components in FIG. 3 (Table 1). Initially, the bot will return omelet recipes from a chosen website based on the user's food preferences. Over time, if the user keeps requesting omelets, the bot will learn the behavior and suggest new omelet recipes to try (component 1). As the user selects a recipe for omelet, the possible common failures (faults) are estimated based on the conversations with the user. FIG. 2 illustrates an exemplary presently disclosed method for the Alexa® TaskBot.

Furthermore, based on the occurred failure, a recovery plan is generated for fool-proof task completion (component 2).

The bot will proactively monitor and walk the user through each step to ensure successful completion of each step and intervene when necessary. If the user does not understand the text description of flipping the omelet by tossing it, a short video or a GIF will be displayed (component 3). In case of failure at step n, e.g., the user tore the omelet, the recovery option of converting to scrambled eggs will be suggested. Further, the bot will advise the user of common failures such as a shard of eggshell falling into the omelet while breaking the egg to successfully orchestrate the execution of each step (component 4). If the user tore the omelet every time in the past while tossing it, the bot will suggest the recipe from a different source that does not involve tossing the omelet, or the bot will recommend different egg-based recipes such as scrambled eggs (component 5).

If the user picks an omelet for egg-based breakfast recipes most of the time, the bot will observe and learn that preference. This will be confirmed with the user when necessary (component 6). The learned preferences will be constantly updated in the user-specific KG. A domain-specific KG such as ingredient substitution ontology that provides alternate ingredients in case of a missing ingredient or meal restrictions will be curated. If the user is vegan, meat can be replaced with mushrooms in an omelet (component 7). Encouraging the user after each step or suggesting new and interesting recipes such as a French herb omelet that the user might not have tried will make cooking a recreational activity (component 8).

FIG. 3 (TABLE 1) describes the components of the presently disclosed framework with existing works in practice.

Evaluation

We will evaluate along both metrics that have been used by the community [6], [7], [8], [9], [10], as well as those which highlight the unique characteristics of our solution.

The list of metrics used to evaluate are as follows:
M1—Task Completion: Whether the task was completed or not.
M2—Fault tolerance: If the task was completed successfully even after the user faced issues while executing the task.
M3—Dialog Efficiency: If the task was completed with the minimum number of dialogue exchange.
M4—Usefulness: If the contents suggested by the system is useful.
M5—Ease of Use: If the system was intuitive in the usage and the user was able to use it without any effort.
M6—Satisfaction: If the user had a good experience and the user will use the bot.
M7—Interaction: If the user appreciated the manner of interaction of the system.
M8—Accurate and Believable Content: When it comes to facts, the response of the system is accurate and believable.
M9—Valuable Content: The recovery options suggested by the system are valuable.

A. Technical Architecture Details

We use an architecture [11] which presents a multimodal assistant to explore astronomy data. Key components of our architecture are as follows:
User. The user input can be in the form of either speech or image or a combination of both.
VA: This is the user interface of our VA.
Multimodal Pipeline (C1): This pipeline consists of NLP core, Visual Core, Contextual Entity Linker, Intent Classifier and Query Classifier. This would help VA to process the user query, identify the problem and its domain (e.g., cooking some dish, fixing some tool, etc.).
Orchestrator (C2): Orchestrator is responsible for choosing the right workflow depending on the user query/problem/feedback. We explain the workflows in the next section.
Storage (C3): This is VA's storage, which has the user-specific personalized KG and the domain-specific KG (e.g., cooking or DIY) which will suggest alternate ingredients or tools to the user.

Executor (C4): Executor is the final block which executes the workflow path chosen by the orchestrator that will display/utter the response during the interface.

Fallback Handler (C5): If the VA is not able to understand the user's query/response/feedback, it will result in a fallback response from VA to the user.

Instruction Miner (C6): It will mine the relevant instructions (DIY) or the recipe (cooking) from reliable sources (e.g., wikihow.com) for the given user query.

Planner (C7): Planner is responsible for generating a plan for the given task or for retrieving a plan if one already exists for that particular task. It will come up with a recovery plan using our top-k failures and recovery plans dataset if the user reports an instruction failure. This dataset will dynamically be updated if new recovery plans are mined by the instruction miner.

B. Workflow

The input from the user can be in the form of speech or in the form of live camera feed. The user query will be processed in the pipeline (C1) to identify the problem and its domain (e.g., cooking, car repair, mowing a lawn, etc.). Based on the domain and the problem, the orchestrator (C2) chooses a particular workflow path. Some of the typical workflow paths are:

Path-1: C1→C2→C7→C2→C6→C2→C7→C2→C4 (without personalization)

If the user asks the VA to give a solution to a problem, it will search if it has an existing plan for solving this problem (i.e., a solution the user asked for in the past). If the plan does not exist, the instructions to solve that problem will be mined from reliable sources (e.g., wikihow.com) by the instruction miner. Based on this, a plan will be generated (plan generation) by the planner (C7), and the executor (C4) will deliver step-by-step instructions to the user through the interface.

Path-2: C1→C2→C7→C2→C6→C2→C3→C2→C7→C2→C4 (with personalization)

Our VA learns about user's dietary restrictions and health conditions during day-to-day conversations and stores all this information in the form of a KG. For example, if one of the instructions is to use oil to cook an omelet and the user does not prefer using oil, VA will ask the user if he/she wants to cook it with butter instead of oil. The suggested alternative to the ingredient comes from the alternative ingredients KG which will suggest healthy alternatives. We make use of these KGs to give the user a more personalized experience. In addition to what the VA did in the above-mentioned path, it will add the personalized suggestions to every instruction that is mined. For example, the VA might warn the user to be careful while fixing the tire as the VA knows that the user has orthopedic problems. The plan will also be updated accordingly by the planner (C7) (replanning).

Path-3: C1→C2→C7→C2→C4

If the plan to solve this problem already exists, that plan will be fetched (plan retrieval) using the planner (C7), and the executor (C4) will deliver step-by-step instructions to the user through the interface.

Path-4: C1→C2→C3→C2→C7→C2→C4

Alexa® waits for the user to finish a step and then confirms if he/she is able to perform it before proceeding to the next step. If the user gives feedback saying that he/she does not have a particular ingredient/tool, Alexa® will fetch an alternative ingredient/tool from the KG (in C3). The plan will also be updated accordingly by the planner (C7) (replanning).

Path-5: C1→C2→C7→C2→C4 (if recovery plan exists in the table)

The user might fail while performing a certain step. For example, while heating butter, if the user ends up burning it completely, the user can ask the VA for any suggestions. The planner (C7) will have a look up a table with different cooking recipes and the top-k failures that might occur while performing that task, the probability of those failures happening, and their recovery plans. After performing those steps, the VA suggests an existing recovery plan for that failure. In our case, the VA will suggest the user to store the burned butter and use it for a different recipe later where it might be useful. The plan will again be updated (replanning).

Path-6: C1→C2→C7→C2→C4 (if recovery plan does not exist in the table).

C. Related Works

Although a cooking ontology has been developed to be integrated with a dialog system [12], less research has been done into incorporating personalization and contextual adaptation in recommending recipes. There are several datasets for cooking recipes [13] but an approach to model recovery plans for a given recipe in case of a failure at a given time has not been researched.

The ontology referred to above comprehends four main modules covering the key concepts of the cooking domain—actions, food, recipes, and utensils—and three auxiliary modules—units and measures, equivalencies, and plate types. We aim to create a cooking-specific KG which could suggest an alternative ingredient if the user says that they do not have a particular ingredient or if the user has any restrictions or preferences and chooses not to use a specific ingredient in their recipe. We also aim to build a similar KG in the DIY domain.

Most of the existing approaches to tackle DIY home improvement tasks are based on analyzing information from wikihow.com. Despite previous studies utilizing temporal ordering of relations among procedural events, this approach lacks scalability and is training data intensive. [14] Other studies have developed a chatbot to better assist novice users in performing DIY tasks using hierarchical planning and domain-specific ontology [15]; however, this approach does not address the issue of handling failures. Still another study attempts to predict the need for revision requirements of instructions obtained from wikihow.com, which can be employed to rank the curated content in our presently disclosed task bot system. [16]

One important component that chatbots require is personalization as it makes the user feel as if they are talking to a real person rather than a bot. A knowledge-enabled personalized chatbot for asthma self-management was built during a study demonstrating that requirement. [5] We aim to add such a feature to our VA which could learn the user's preferences and health conditions from day-to-day conversations and store it in the form of a KG.

While certain embodiments of the disclosed subject matter have been described using specific terms, such description is for illustrative purposes only, and it is to be understood that changes and variations may be made without departing from the spirit or scope of the subject matter. This written description uses examples to disclose the presently disclosed subject matter, including the best mode, and also to enable any person skilled in the art to practice the presently disclosed subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

REFERENCES

1. "1st alexa prize taskbot challenge: Official rules," 2021. [Online]. Available: https://developer.amazon.com/alexaprize/challenges/current-challenge/taskbot/rules
2. T. S. Food Network UK—TV Channel—Easy Recipes, "Food network kitchens," 2021. [Online]. Available: https://www.foodnetwork.com/fn-dish/news/echo-show-food-network-kitchen-features
3. S. Engelhardt, E. Hansson, and I. Leite, "Better faulty than sorry: Investigating social recovery strategies to minimize the impact of failure in human-robot interaction." in *WCIHAI@ IVA*, 2017, pp. 19-27.
4. J. Xu, X. Zheng, and W. Ding, "Personalized recommendation based on reviews and ratings alleviating the sparsity problem of collaborative filtering," in *2012 IEEE Ninth International Conference on e-Business Engineering*. IEEE, 2012, pp. 9-16.
5. D. Kadariya, R. Venkataramanan, H. Y. Yip, M. Kalra, K. Thirunarayanan, and A. Sheth, "Kbot: Knowledge-enabled personalized chatbot for asthma self-management," in *2019 IEEE International Conference on Smart Computing (SMARTCOMP)*. IEEE, 2019, pp. 138-143.
6. B. Srivastava, F. Rossi, S. Usmani, and M. Bernagozzi, "Personalized chatbot trustworthiness ratings," *IEEE Transactions on Technology and Society*, vol. 1, no. 4, pp. 184-192, 2020.
7. M. A. Walker, A. I. Rudnicky, J. Aberdeen, E. O. Bratt, J. S. Garofolo, H. Hastie, A. N. Le, B. Pellom, A. Potamianos, R. Passonneau et al., "Darpa communicator evaluation: Progress from 2000 to 2001," in *Seventh International Conference on Spoken Language Processing*, 2002.
8. J. Deriu, A. Rodrigo, A. Otegi, G. Echegoyen, S. Rosset, E. Agirre, and M. Cieliebak, "Survey on evaluation methods for dialogue systems," *Artificial Intelligence Review*, vol. 54, no. 1, pp. 755-810, 2021.
9. X. Chen, J. Mi, M. Jia, Y. Han, M. Zhou, T. Wu, and D. Guan, "Chat with smart conversational agents: how to evaluate chat experience in smart home," in *Proceedings of the 21st International Conference on Human-Computer Interaction with Mobile Devices and Services*, 2019, pp. 1-6.
10. R. I. Dunbar, A. Marriott, and N. D. Duncan, "Human conversational behavior," *Human nature*, vol. 8, no. 3, pp. 231-246, 1997.
11. J. O. Kephart, V. C. Dibia, J. Ellis, B. Srivastava, K. Talamadupula, and M. Dholakia, "An embodied cognitive assistant for visualizing and analyzing exoplanet data," *IEEE Internet Computing*, vol. 2, no. 2, pp. 31-39, 2019.
12. R. Ribeiro, F. Batista, J. P. Pardal, N. J. Mamede, and H. S. Pinto, "Cooking an ontology," in *International Conference on Artificial Intelligence: Methodology, Systems, and Applications*. Springer, 2006, pp. 213-221.
13. R. Lee and R. Lee, "Recipe box," 2021. [Online]. Available: https://eightportions.com/datasets/Recipes/fn:1
14. Q. Lyu, L. Zhang, and C. Callison-Burch, "Reasoning about goals, steps, and temporal ordering with wikihow," *arXiv preprint arXiv:2009.07690*, 2020.
15. G. Behnke, P. Bercher, M. Kraus, M. Schiller, K. Mickeleit, T. H" age, M. Dorna, M. Dambier, D. Manstetten, W. Minker et al., "New developments for robert—assisting novice users even better in diy projects," in *Proceedings of the International Conference on Automated Planning and Scheduling*, vol. 30, 2020, pp. 343-347.
16. I. Bhat, T. Anthonio, and M. Roth, "Towards modeling revision requirements in wikihow instructions," in *Proceedings of the 2020 Conference on Empirical Methods in Natural Language Processing (EMNLP)*, 2020, pp. 8407-8414.
17. Stieglitz, S., Brachten, F., & Kissmer, T. (2018). Defining bots in an enterprise context.
18. Higham, J. P., & Hebets, E. A. (2013). An introduction to multimodal communication. Behavioral Ecology and Sociobiology, 67(9), 1381-1388.
19. Behnke, G., Bercher, P., Kraus, M., Schiller, M., Mickeleit, K., Hage, T., et. al (2020, June). New developments for Robert—Assisting novice users even better in DIY projects. In Proceedings of the International Conference on Automated Planning and Scheduling (Vol. 30, pp. 343-347).
20. Bhat, I., Anthonio, T., & Roth, M. (2020, November). Towards Modeling Revision Requirements in wikiHow Instructions. In Proceedings of the 2020 Conference on Empirical Methods in Natural Language Processing (EMNLP) (pp. 8407-8414).
21. Engelhardt, S., Hansson, E., & Leite, I. (2017, August). Better Faulty than Sorry: Investigating Social Recovery Strategies to Minimize the Impact of Failure in Human-Robot Interaction. In WCIHAI@ IVA (pp. 19-27).
22. Sonboli, N., Smith, J. J., Berenfus, F. C., Burke, R., & Fiesler, C. (2021). Fairness and Transparency in Recommendation: The Users' Perspective. arXiv preprint arXiv:2103.08786.
23. Kadariya, D., Venkataramanan, R., Yip, H. Y., Kalra, M., Thirunarayanan, K., & Sheth, A. (2019, June). KBot: Knowledge-enabled personalized chatbot for asthma self-management. In 2019 IEEE International Conference on Smart Computing (SMARTCOMP) (pp. 138-143). IEEE.
24. Farmer, N., Touchton-Leonard, K., & Ross, A. (2018). Psychosocial benefits of cooking interventions: a systematic review. Health education & behavior, 45(2), 167-180.

What is claimed is:
1. A method comprising:
using at least one or more processors programmed to perform acts of:
accessing information specifying at least one corresponding user-specified task to be achieved;
in response to the user-specified task, causing a virtual assistant executing on the one or more processors to:
discover instructions from online data sources for achieving the user-specified task,
assist the user in performing the instructions or monitor execution of the instructions by the user,
observe failures of execution of the instructions, and
help recover from action and instruction level failures till completion of the user-specified task, wherein the one or more processors are further programmed for causing the virtual assistant to operate with at least one of the following path workflows:

Path-1: C1→C2→C7→C2→C6→C2→C7→C2→C4 (without personalization),

Path-2: C1→C2→C7→C2→C6→C2→C3→C2→C7→C2→C4 (with personalization),

Path-3: C1→C2→C7→C2→C4,

Path-4: C1→C2→C3→C2→C7→C2→C4,

Path-5: C1→C2→C7→C2→C4 (if recovery plan exists in the table), or

Path-6: C1→C2→C7→C2→C4 (if recovery plan does not exist in the table), where
- C1 comprises a Multimodal Pipeline to process the user query, identify the problem and its domain,
- C2 comprises an Orchestrator responsible for choosing the right workflow depending on the user input,
- C3 comprises the VA Storage,
- C4 comprises an Executor,
- C6 comprises an Instruction Miner for mining relevant instructions from reliable sources for a given user query or task, and
- C7 comprises a Planner responsible for generating a plan for the given task or for retrieving a plan if a plan already exists for that particular task.

2. A method according to claim 1, wherein the one or more processors are further programmed for automatic speech recognition for accessing information specifying a user-specified task from verbal input from the user.

3. A method according to claim 1, wherein the one or more processors are further programmed for multimodal input including at least one of automatic speech recognition, text input, and visual input for accessing information from the user specifying a user-specified task.

4. A method according to claim 3, wherein the one or more processors are further programmed for causing the virtual assistant to operate a Multimodal Pipeline for assimilating multimodal user input and for identifying user intent and question type.

5. A method according to claim 1, wherein the one or more processors are further programmed for causing the virtual assistant to provide at least one of audio and visual instructions to assist the user in performing the task.

6. A method according to claim 1, wherein the one or more processors are further programmed for causing the virtual assistant to analyze the instructions for vulnerability and to create recovery plans.

7. A method according to claim 1, wherein the one or more processors are further programmed for causing the virtual assistant to recommend instructions from online data sources based on online trends for addressing the user-specified task.

8. A method according to claim 1, wherein the one or more processors are further programmed for causing the virtual assistant to provide additional recommendations to the user while the user is executing the instructions based on observed performance of the user.

9. A method according to claim 1, wherein the one or more processors are further programmed for causing the virtual assistant to operate per a fallback executor if communications with the user become out of scope of set parameters.

10. A method according to claim 1, wherein the Multimodal Pipeline (C1) comprises at least one of NLP core, Visual Core, Contextual Entity Linker, Intent Classifier and Query Classifier.

11. A method according to claim 1, wherein the Storage (C3) comprises a user specific knowledge graph (Personalized KG) and a domain specific knowledge graph.

12. A method according to claim 1, wherein the Executor (C4) executes the workflow path chosen by the Orchestrator and outputs the response using an output interface.

13. A method according to claim 1, wherein the Planner (C7) is further operative for providing a recovery plan using top-k failures and recovery plans dataset, if the user reports an instruction failure.

14. A method according to claim 13, wherein the one or more processors are further programmed for causing the virtual assistant Planner to dynamically update if new recovery plans are mined by the Instruction Miner.

15. At least one non-transitory computer-readable storage medium storing processor-executable instructions that, when executed by at least one or more computer processors, cause the at least one or more computer processors to perform a method comprising acts of:
- accessing information specifying at least one corresponding user-specified task to be achieved;
- in response to the user-specified task, causing a virtual assistant executing on the one or more computer processors to:
  - discover instructions from online data sources for achieving the user-specified task,
  - assist the user in performing the instructions or monitor execution of the instructions by the user,
  - observe failures of execution of the instructions, and
  - help recover from action and instruction level failures till completion of the user-specified task,
- wherein the one or more computer processors are further programmed for causing the virtual assistant to operate with at least one of the following path workflows:

Path-1: C1→C2→C7→C2→C6→C2→C7→C2→C4 (without personalization),

Path-2: C1→C2→C7→C2→C6→C2→C3→C2→C7→C2→C4 (with personalization),

Path-3: C1→C2→C7→C2→C4,

Path-4: C1→C2→C3→C2→C7→C2→C4,

Path-5: C1→C2→C7→C2→C4 (if recovery plan exists in the table), or

Path-6: C1→C2→C7→C2→C4 (if recovery plan does not exist in the table), where
- C1 comprises a Multimodal Pipeline to process the user query, identify the problem and its domain,
- C2 comprises an Orchestrator responsible for choosing the right workflow depending on the user input,
- C3 comprises the VA Storage,
- C4 comprises an Executor,
- C6 comprises an Instruction Miner for mining relevant instructions from reliable sources for a given user query or task, and
- C7 comprises a Planner responsible for generating a plan for the given task or for retrieving a plan if a plan already exists for that particular task.

16. A system comprising at least one or more computer processors programmed to perform acts of:
- accessing information specifying at least one corresponding user-specified task to be achieved;

in response to the user-specified task, causing a virtual assistant executing on the one or more computer processors to:
  discover instructions from online data sources for achieving the user-specified task,
  assist the user in performing the instructions or monitor execution of the instructions by the user,
  observe failures of execution of the instructions, and
  help recover from action and instruction level failures till completion of the user-specified task,
wherein the one or more computer processors are further programmed for causing the virtual assistant to operate with at least one of the following path workflows:
Path-1: C1→C2→C7→C2→C6→C2→C7→C2→C4 (without personalization),
Path-2: C1→C2→C7→C2→C6→C2→C3→C2→C7→C2→C4 (with personalization),
Path-3: C1→C2→C7→C2→C4,
Path-4: C1→C2→C3→C2→C7→C2→C4,
Path-5: C1→C2→C7→C2→C4 (if recovery plan exists in the table), or
Path-6: C1→C2→C7→C2→C4 (if recovery plan does not exist in the table),
where
  C1 comprises a Multimodal Pipeline to process the user query, identify the problem and its domain,
  C2 comprises an Orchestrator responsible for choosing the right workflow depending on the user input,
  C3 comprises the VA Storage,
  C4 comprises an Executor,
  C6 comprises an Instruction Miner for mining relevant instructions from reliable sources for a given user query or task, and
  C7 comprises a Planner responsible for generating a plan for the given task or for retrieving a plan if a plan already exists for that particular task.

* * * * *